Feb. 23, 1954   L. J. PROEBSTLE   2,670,162
SUPPORTING ENCLOSURE FOR JETTISONABLE
FLEXIBLE FUEL CELLS
Filed Feb. 24, 1949   3 Sheets-Sheet 1
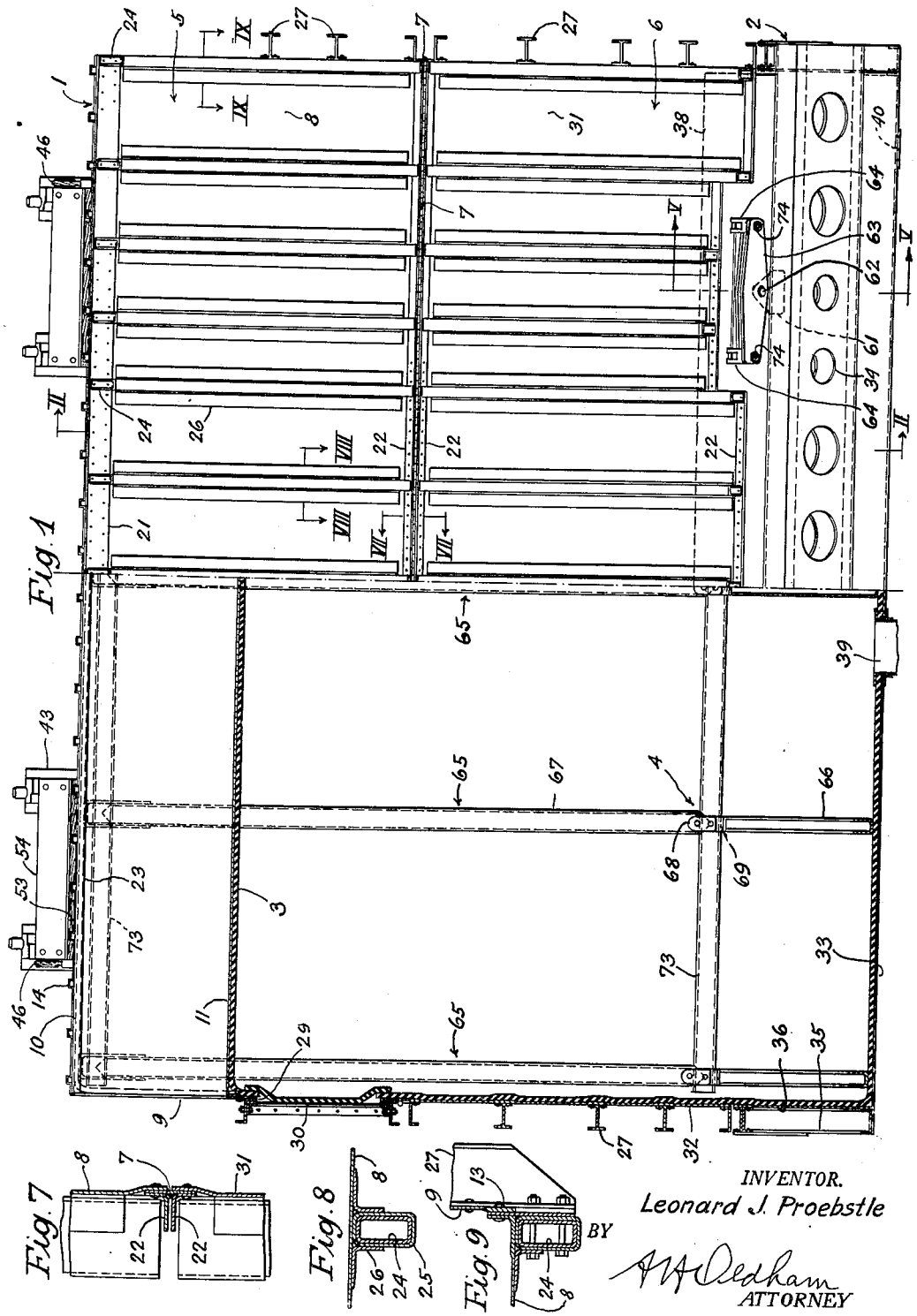
INVENTOR.
Leonard J. Proebstle
BY
H H Oldham
ATTORNEY

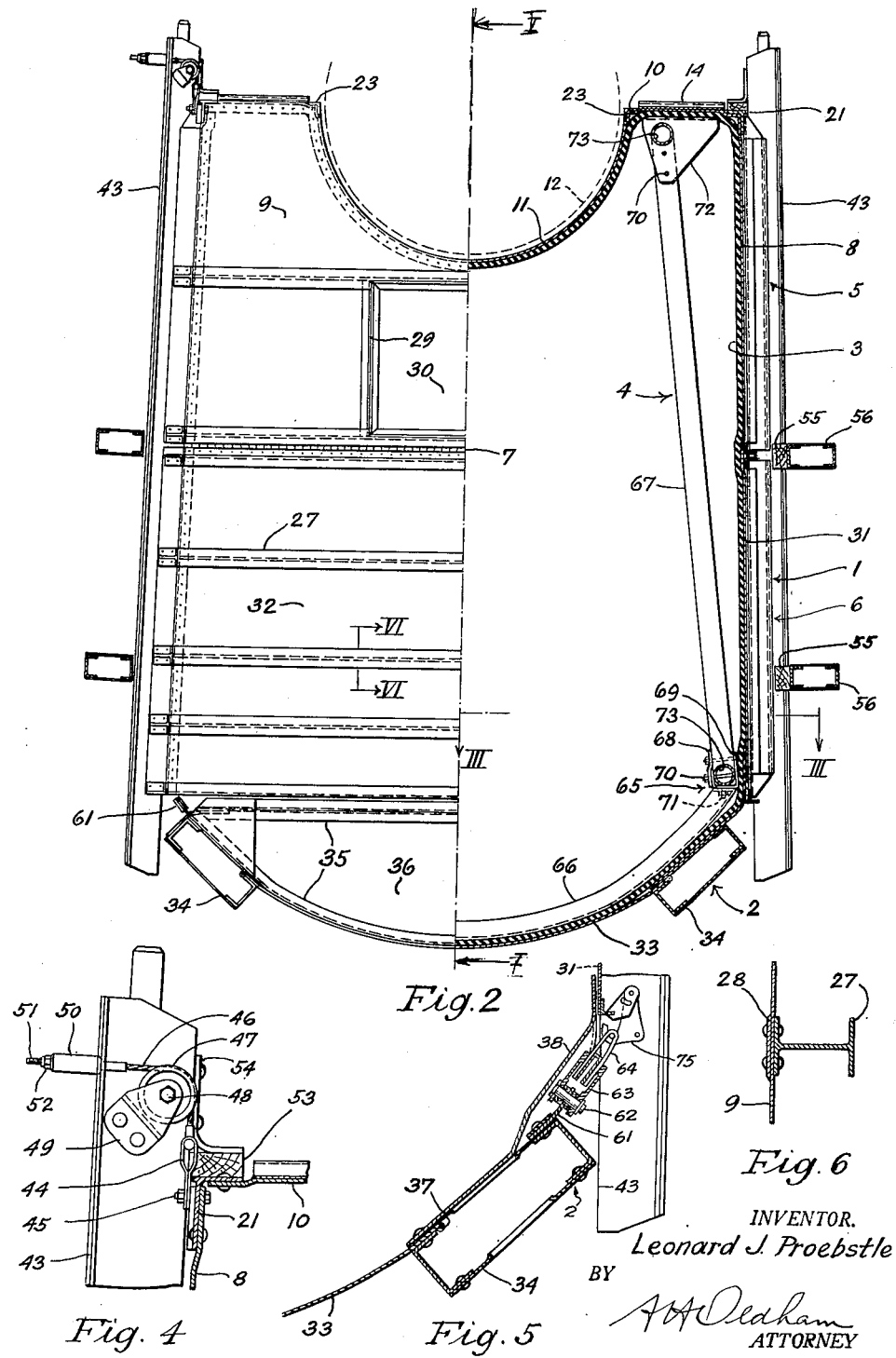

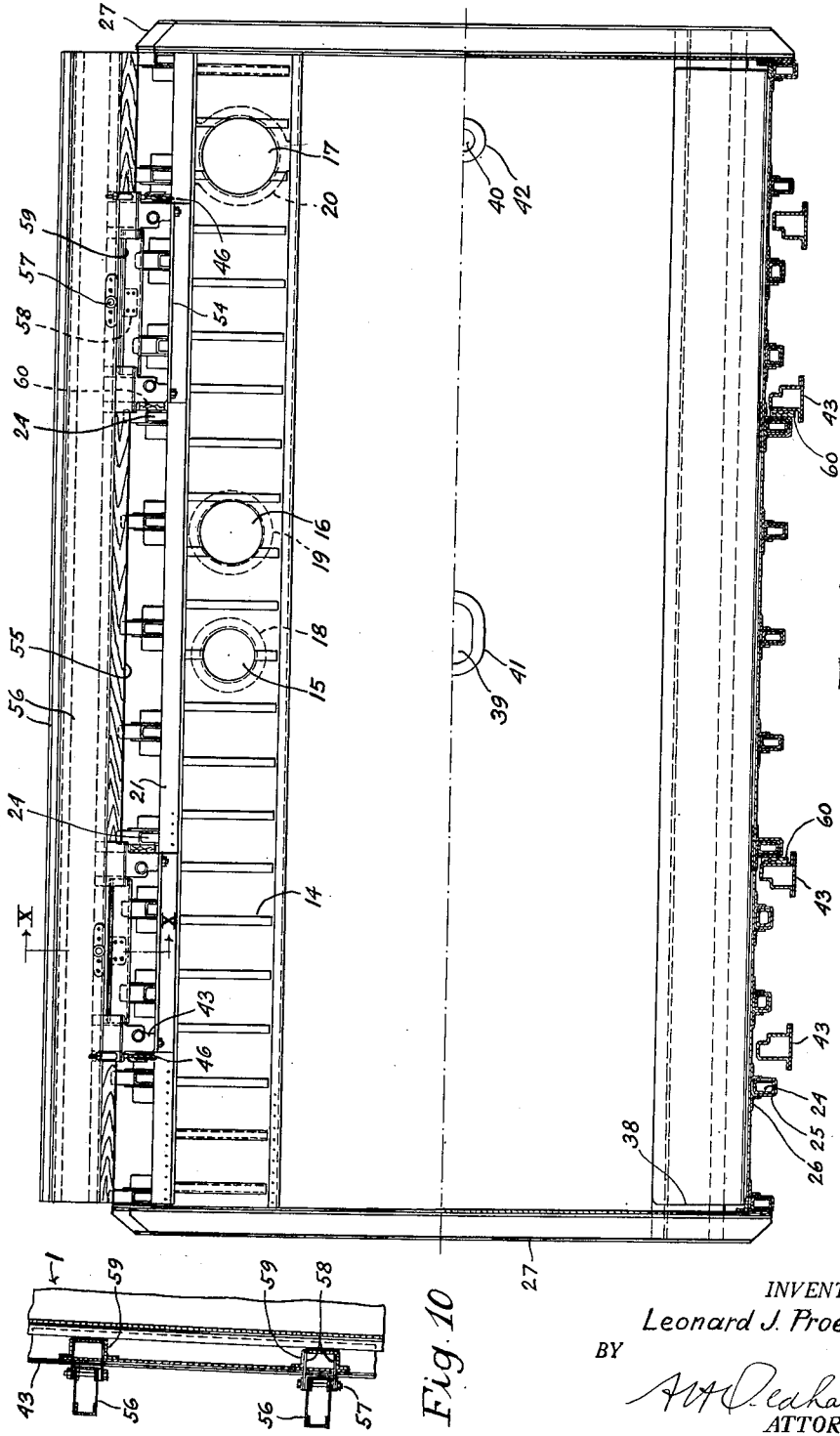

Patented Feb. 23, 1954

2,670,162

UNITED STATES PATENT OFFICE 2,670,162

SUPPORTING ENCLOSURE FOR JETTISONABLE FLEXIBLE FUEL CELLS

Leonard J. Proebstle, Massillon, Ohio, assignor to Goodyear Aircraft Corporation, Akron, Ohio, a corporation of Delaware Application February 24, 1949, Serial No. 78,165

8 Claims. (Cl. 244—135)

This invention relates to jettisonable flexible fuel cell for aircraft and in particular to supporting enclosures therefor.

In the patent application of Leonard J. Proebstle, Serial No. 69,738, filed January 7, 1949, now U. S. Patent No. 2,638,138, is disclosed a supporting enclosure for flexible fuel cells, which are separate structures and this invention is a modification thereof, inasmuch as the supporting enclosure illustrated and described provides for jettisoning the fuel cell therefrom.

Heretofore, it has been known to jettison flexible fuel cells from an aircraft, however, in these cases the fuel cell was permanently united with its rigid supporting enclosure whereby it occurred occasionally that in releasing the stiff fuel container, when struck by the air stream, it was tilted and jammed in the airplane, which condition required additional handling for its release.

It is the general object of the invention to avoid and overcome the foregoing and other difficulties of and objections to prior art practices by the provision of a rigid supporting enclosure being a structure separate from the flexible portion of the fuel container, whereby, in releasing only the separately suspended bottom of the enclosure, the fuel cell is jettisoned together with this bottom.

Another object of the invention is to prevent interference of the fuel tank with the aircraft structure by only releasing the flexible fuel cell and the bottom of the supporting enclosure on which it rests and using the fixed portion of the fuel cell enclosure as a protecting means against accidents in a jettisoning operation.

Another object of the invention is to save the main portion of the supporting enclosure against loss in a jettisoning operation by having it permanently fixed in the aircraft.

Another object of the invention is to provide a more economical construction which can be easily assembled and readily repaired, because of the separation of the flexible fuel cell and its rigid supporting enclosure.

Another object of the invention is the possibility of quickly exchanging a heavy bullet-proof flexible fuel cell with a light bladder type fuel cell and vice versa, as circumstances require.

The aforesaid objects of the invention and other objects which will become apparent as the description proceeds, are accomplished by providing a rigid fuel cell supporting enclosure made essentially in two parts, one of which, the largest, is permanently fixed in the bomb rack or fuselage cargo space of an aircraft, and the smaller part, its bottom, is made releasable, whereas the flexible fuel cell is loosely inserted in its enclosure and rests on the releasable bottom thereof, so that the cell can be jettisoned by releasing its bottom support. Whereas, for commercial airplanes a bladder type fuel cell is being used as a rule, for military airplanes either a bullet-proof fuel cell or a bladder type fuel cell may be used exchangeably, depending on flight requirements. For this reason, removability of the fuel cell from the supporting casing is of great advantage, since the fixed supporting casing structure can be built and left permanently in position. In case bulletproof cells are required the supporting enclosure should be made of resin-impregnated fibrous material, whereas, for the bladder type fuel cell any other material of lower cost, preferably Duralumin, could be used instead.

Inasmuch as the invention has been originally developed for bullet sealing fuel cells it has been illustrated for the use with such cells and shall be described accordingly.

For a better understanding of the invention reference should be had to the accompanying drawings, wherein:

Fig. 1 is a side view, omitting the front bomb rack portion, of one embodiment of the invention, one-half being shown in cross-section taken on line I—I of Fig. 2, Fig. 2 is an end view of Fig. 1, one-half being shown in cross-section taken on line II—II of Fig. 1, Fig. 3 is a top view of Fig. 1, one-half being shown in cross-section taken on line III—III of Fig. 2, omitting the fuel cell, Fig. 4 is a side view, in larger scale, of the suspension of the fixed portion of the supporting enclosure, Fig. 5 is a fragmentary transverse cross-sectional view, in larger scale, taken on line V—V of Fig. 1, Fig. 6 is a cross-sectional view, in larger scale, on line VI—VI of Fig. 2, Fig. 7 is a fragmentary cross-sectional view, in larger scale, taken on line VII—VII of Fig. 1, Fig. 8 is a cross-sectional view, in larger scale, taken on line VIII—VIII of Fig. 1, Fig. 9 is a cross-sectional view, in larger scale, taken on line IX—IX of Fig. 1, and Fig. 10 is a vertical cross-sectional view, taken on line X—X of Fig. 3.

With specific reference to the form of the invention illustrated in the drawings the numeral 1 indicates, in general, the larger fixed portion of the fuel cell enclosure having a separate releasable bottom 2, suspended by releasable means, on which rests the weight of bullet-proof fuel cell 3 having an internal supporting structure 4. The fixed portion 1, for reasons of easier installation because of its large size, is made in two parts, an upper part 5 and a lower part 6 connected together by piano hinges 7. These two parts, of course, could be built as a single unit.

The upper part 5 consists of side walls 8, end walls 9, and a top wall 10 which along its longitudinal center is provided with a semi-cylindrical cavity 11 to make room for a cylindrical part 12 of the aircraft. In this case, for protection of the bullet-proof fuel cell, the semi-rigid, relatively thin walls of the enclosure 1 are made of two or more layers of resin-impregnated fibrous material which preferably consists of nylon cloth for the side walls 8 and end walls 9, and of glass fibre cloth for the top wall 10. The side walls 8 are flanged along their vertical edges (Fig. 9) which are reinforced with glass fibre cloth where they are joined, usually by rivets 13, with the end walls. The flat portions of the top wall 10 are reinforced by corrugated sheets 14 made of glass fibre cloth, whereas its round portion is left plain, because of its greater stiffness. Around the openings 15, 16 and 17 of the top wall for outside connections to the fuel cell 3 are attached flanged glass fibre cloth rings 18, 19 and 20, respectively, to serve as stiffenings.

The longitudinal edges of the top wall 10 are secured by rivets to the inside of the flange of relatively heavy unsymmetrical T-shaped Duralumin bars 21 to the web of which are attached, also by rivets, the side walls 8 which at the bottom are provided with Duralumin angles 22. Similar angles 23 reinforce the inner corners of the top wall 10. Vertical Duralumin tubes 24 of rectangular cross-section and surrounded by a cover 25, made of the same material as the side walls, are riveted with their ends to the T-bars 21 and to the angles 22 and are, in addition, bonded by angles 26, made of nylon cloth and attached to the cover 25, to the wall along substantially their full length. The end walls 9, which are flat, are reinforced transversely by I-shaped Duralumin stiffeners 27 opposite of which the walls on the inside have bonded thereto glass fibre cloth strips 28 (Fig. 6) through which the stiffeners are riveted to the walls. The ends of the stiffeners 27 extending beyond the end walls are fastened to the end corner ribs 24 of the side walls. One of the end walls 9 is provided with a manhole 29 closed by a cover 30. A similar opening and cover and opposite of the hole 29 is provided in the fuel cell 3 to make it accessible for inserting and assembling the cell supporting structure 4, and, if necessary, for repairs.

The lower part 6 of the fixed fuel cell enclosure consists only of side walls 31 and end walls 32 which are of similar construction as those of the upper part 5 and, therefore, do not require further description.

The trough-shaped releaseable bottom 2, on which rests the fuel cell, comprises a shell 33 preferably made of resin impregnated nylon fabric, which is held in a rigid structure consisting of side girders 34 of rectangular cross-section and end frames 35 attached thereto. On their inside the frames 35 are provided with walls 36, also made of nylon fabric. As shown in larger scale in Fig. 5, the shell 33 having reinforced edges, is inserted between the lower channels and side plates of the girders 34 and are riveted thereto. In addition the longitudinal edges of the shell 33, which extend beyond the channel flanges, have enclosed retaining wires 37 to prevent slippage of the shell from its riveted joints. To the inside of the girders 34 are attached aprons 38, also made of resin-impregnated fibrous material, which cover the gap between the releaseable bottom 2 and the lower portion of the fixed enclosure 1. In the bottom of the shell 33 are provided openings 39 and 40 with reinforcements 41 and 42, respectively, around their edges for fuel cell outlets and attachments.

As shown in Figs. 2 and 4 the stationary portion 1 of the supporting enclosure is suspended from a conventional bomb rack, for example, in the fuselage of an airplane, which includes, suitably spaced, substantially vertical bars 43 disposed at two sides opposite of and closely to the enclosure 1. The suspension is achieved by loops 44 fastened by bolts 45 to the upper end of the enclosure and which engage one end of pieces of cables 46 drained over pulleys 47 turnable about pivots 48 held by brackets 49 fastened to the bars 43, whereas the other end of the cables 46 passes through sleeves 50 resting against the bars 43 with the cables being made adjustable by bolts 51 secured to the cables and by nuts 52 resting against the sleeves 50. In its proper position, the enclosure 1 is pulled against wooden liners 53 fastened to the bottom flanges of angles 54, each of which is securely attached to two adjacent bars 43, thereby holding the enclosure 1 in fixed vertical position. In order to be able to resist side forces, the side walls are laterally supported against bulging by wooden strips 55 fastened to longitudinal girders 56 which are held by bolts 57 between brackets 58 attached to bridges 59 which also serve as side wall supports between adjacent bars 43. To prevent the enclosure 1 from longitudinal shifting, spacers 60, preferably of wood, fastened to the inner vertical bars 43, are made to rest against adjacent ribs 24 on the enclosure side walls. Thus, the position of the fuel cell supporting enclosure is fixed relative the aircraft structure in all directions. The semi-rigid shell walls, of course, will bulge out a certain amount between their stiffening ribs.

For suspending the releaseable bottom 2 it is provided at both sides with ears 61 secured to the girders 34 and which carry bolts or pivots 62 each one of which engages a balancing arm 63 provided at both ends with bolts 74 cooperating with pairs of conventional electro-magnetic release shackles 64 of a type similar to that shown in Figs. 2 and 3 of Patent No. 2,435,639 and which are suspended from hooks 75 fixed to the bomb rack bars 43 and to be operated from any convenient point in the aircraft.

In order to keep the flexible fuel cell 3 from collapsing while being handled and inserted into the supporting enclosure 1, and also after it has been placed therein, it is provided with a rigid though somewhat flexible internal supporting structure 4 indicated as a whole, consisting of a number of transverse U-shaped frames 65 and longitudinal spacing members, all of which, together with the necessary fittings, are made of resin-impregnated fibrous material, preferably glass fibre cloth. Each frame 65 comprises a transverse bottom channel 66 resting on the fuel cell, and two upright tubular members 67 connected with the channel by suitable fittings 68 and 69 and bolts 70 and 71. The upper end of the uprights has attached thereto a shoe 12 by bolts 10 to support the top of the fuel cell. The longitudinal tubes 13, on top and bottom, hold the transverse frames in proper distance from each other. To make assembling of the internal support possible its parts are brought in through the manhole provided in the fuel cell and are bolted together throughout.

It will be recognized that the objects of the invention have been achieved by providing a fuel cell supporting enclosure which is a separate part of the fuel cell and of which the greatest portion remains fixed in an aircraft, whereas only its bottom, having a separate suspension, is released together with the fuel cell in a jettison operation. Such construction is a great simplification over previous art and saves a large portion of the fuel cell enclosure which previously was entirely lost when disposing of a fuel tank in flight and thus reduces operating costs in jettisoning a fuel tank.

As already indicated this construction can be used in modified form by making the cell-confining enclosure of metal and with a much lighter bladder type fuel cell when bullet sealing is not a problem. That is, when the aircraft is used for commercial rather than military purposes.

While certain representative embodiments and details have been shown for the purpose of illustrating the invention it will be apparent to those skilled in the art that various changes and modifications may be made therein without departing from the spirit or scope of the invention.

What I claim:

1. The combination of a liquid fuel carrier and the bomb bay of an aircraft and including a bomb rack mounted in the bomb bay, a flexible fuel cell, a substantially rigid form-holding supporting enclosure for the fuel cell inserted in said bomb bay, said enclosure consisting of a stationary main portion combined with a releasable portion supporting the fuel cell, suspension means connecting the top of said stationary enclosure portion with said bomb rack, means on said bomb rack being in abutting relation with said stationary enclosure portion to resist its shifting transversely and longitudinally of said aircraft, and quick release devices supported by said bomb rack attached to said releasable portion and being operable from a suitable point in the aircraft.

2. The combination of a liquid fuel carrier and the bomb bay of an aircraft and including a bomb rack mounted in the bomb bay, a flexible fuel cell, an internal rigid frame in said fuel cell for supporting the cell walls, a substantially rigid form-holding supporting enclosure for the fuel cell inserted in said bomb bay, said enclosure consisting of a stationary main portion combined with a releasable portion supporting the fuel cell, suspension means connecting the top of said stationary enclosure portion with said bomb rack, means on said bomb rack being in abutting relation with said stationary enclosure portion to resist its shifting transversely and longitudinally of said aircraft, and quick release devices supported by said bomb rack attached to said releasable portion and being operable from a suitable point in the aircraft.

3. For an aircraft a self-contained fuel cell unit of substantially rectangular shape in vertical cross-section and adapted to be mounted within but spaced from the aircraft surface, said unit comprising a separate substantially rigid supporting enclosure consisting of a main upper portion fully open at the bottom, a removable bottom portion for closing the bottom of said upper portion, a flexible fuel cell loosely inserted in and seated on said bottom portion and engaging with the sides and top of the main upper portion of the enclosure, means for fixedly supporting said main enclosure portion in the aircraft, and quick-release suspension means attached to said bottom portion for jettisoning said bottom portion together with the flexible fuel cell, said suspension means adapted to be operated from a suitable point in the aircraft.

4. For an aircraft a self-contained fuel cell unit adapted to be mounted within but spaced from the aircraft surface, said unit comprising a separate substantially rigid enclosure consisting of a main upper portion open at the bottom, a removable bottom portion for closing the bottom of the upper portion, a flexible fuel cell loosely inserted in said rigid enclosure and seated on the bottom portion, suspension means for holding said upper enclosure portion in fixed position, and quick-release suspension means attached to said bottom portion for jettisoning said bottom portion together with said flexible fuel cell.

5. For an aircraft a self-contained fuel cell unit comprising a separate substantially rigid enclosure consisting of a stationary main upper portion open at the bottom for sustaining transversely acting fuel cell forces, a removable bottom portion for closing the bottom of the upper portion, a flexible fuel cell loosely inserted in said rigid enclosure, and releasable suspension means for jettisoning said bottom portion together with the fuel cell.

6. For an aircraft, a flexible fuel cell, a separate thin-walled enclosure fully surrounding the fuel cell and engaging with and supporting the sides, top and bottom thereof, spaced reinforcing ribs strengthening the outside of the thin-walled enclosure to render it self-supporting even with a full load of fuel in the cell, a pair of supporting frames in fixed position adjacent the sides of the enclosure and in engagement with the ribs thereof to prevent transverse shifting of the enclosure in rolling and pitching of the aircraft, pulley means mounted on the frame near its top, adjustable length cable means secured to the frame, extending over the pulley means and secured to the enclosure to support it in the frame, a removable bottom on the enclosure, and quick-release means for fastening the bottom to the enclosure so that when the release means are actuated the bottom and the fuel cell will be jettisoned.

7. For an aircraft, a flexible fuel cell, a separate thin-walled enclosure fully surrounding the fuel cell and engaging with and supporting the sides, top and bottom thereof, spaced reinforcing ribs strengthening the outside of the thin-walled enclosure to render it self-supporting even with a full load of fuel in the cell, a pair of supporting frames in fixed position adjacent the sides of the enclosure and in engagement with the ribs thereof to prevent transverse shifting of the enclosure in rolling and pitching of the aircraft, means for mounting the enclosure in the frame, a removable bottom on the enclosure, and quick-release means for fastening the bottom to the enclosure so that when the release means are actuated the bottom and the fuel cell will be jettisoned.

8. For an aircraft a self-contained fuel cell unit comprising a separate stationary, substantially rigid enclosure fully open at the bottom including a removable portion for closing the bottom of the enclosure, a flexible fuel cell in the enclosure in contact with the walls thereof and seated at the bottom portion, and quick-release suspension means attached to the bottom portion for jettisoning the bottom portion from a suitable point of the aircraft.

LEONARD J. PROEBSTLE.

References Cited in the file of this patent

UNITED STATES PATENTS

| Number | Name | Date |
|---|---|---|
| 1,535,532 | Langfelder | Apr. 28, 1925 |
| 2,069,996 | Carleton et al. | Feb. 9, 1937 |
| 2,435,639 | Stockton | Feb. 10, 1948 |
| 2,453,869 | Slate | Nov. 16, 1948 |
| 2,453,870 | Slate | Nov. 16, 1948 |
| 2,481,501 | Darnall, Jr. | Sept. 13, 1949 |

FOREIGN PATENTS

| Number | Country | Date |
|---|---|---|
| 286,735 | Germany | Aug. 25, 1915 |
| 342,084 | Germany | Oct. 12, 1921 |
| 555,984 | Great Britain | Sept. 15, 1943 |

OTHER REFERENCES

Page 146 in "Flight" Magazine of Feb. 11, 1943.